United States Patent

Beach

[15] 3,687,033
[45] Aug. 29, 1972

[54] MECHANISM FOR OPERATING A CAMERA SHUTTER AND A MECHANICALLY OPERABLE FLASH DEVICE IN SYNCHRONISM

[72] Inventor: David E. Beach, 901 Elmgrove Road, Rochester, N.Y. 14650

[22] Filed: March 30, 1970

[21] Appl. No.: 23,534

[52] U.S. Cl. ............................................95/11.5 R
[51] Int. Cl. ............................................G03b 15/04
[58] Field of Search ..................................95/11.5 R

[56] References Cited

UNITED STATES PATENTS

| | | | |
|---|---|---|---|
| 2,972,937 | 2/1961 | Suits | 95/11.5 |
| 3,528,353 | 9/1970 | Colville | 95/11.5 X |
| 3,037,438 | 6/1962 | Junghans et al. | 95/11.5 |
| 1,152,203 | 8/1915 | Nesbit | 95/11.5 |
| 3,576,156 | 4/1971 | Michatek | 95/11.5 |
| 3,552,287 | 1/1971 | Fink | 95/11.5 |

*Primary Examiner*—Samuel S. Matthews
*Assistant Examiner*—Michael L. Geliner
*Attorney*—Robert W. Hampton and J. Addison Mathews

[57] ABSTRACT

A camera or other photographic apparatus having a shutter mechanism and using flash devices is provided with a mechanism for operating the shutter and firing the flash device in synchronism. The mechanism stores energy in response to depression of the camera body release, and then suddenly releases the stored energy through a synchronizing member causing the member to move in an operative path to actuate the flash device and the shutter mechanism.

13 Claims, 5 Drawing Figures

Patented Aug. 29, 1972
3,687,033
2 Sheets-Sheet 1
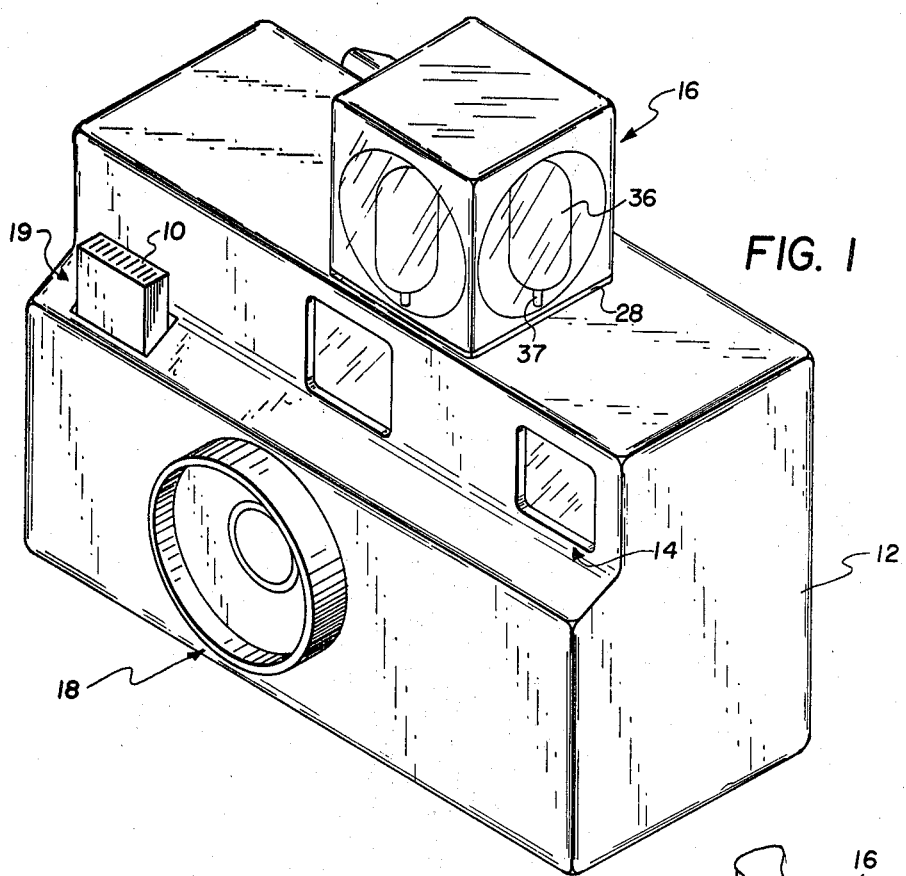
FIG. 1
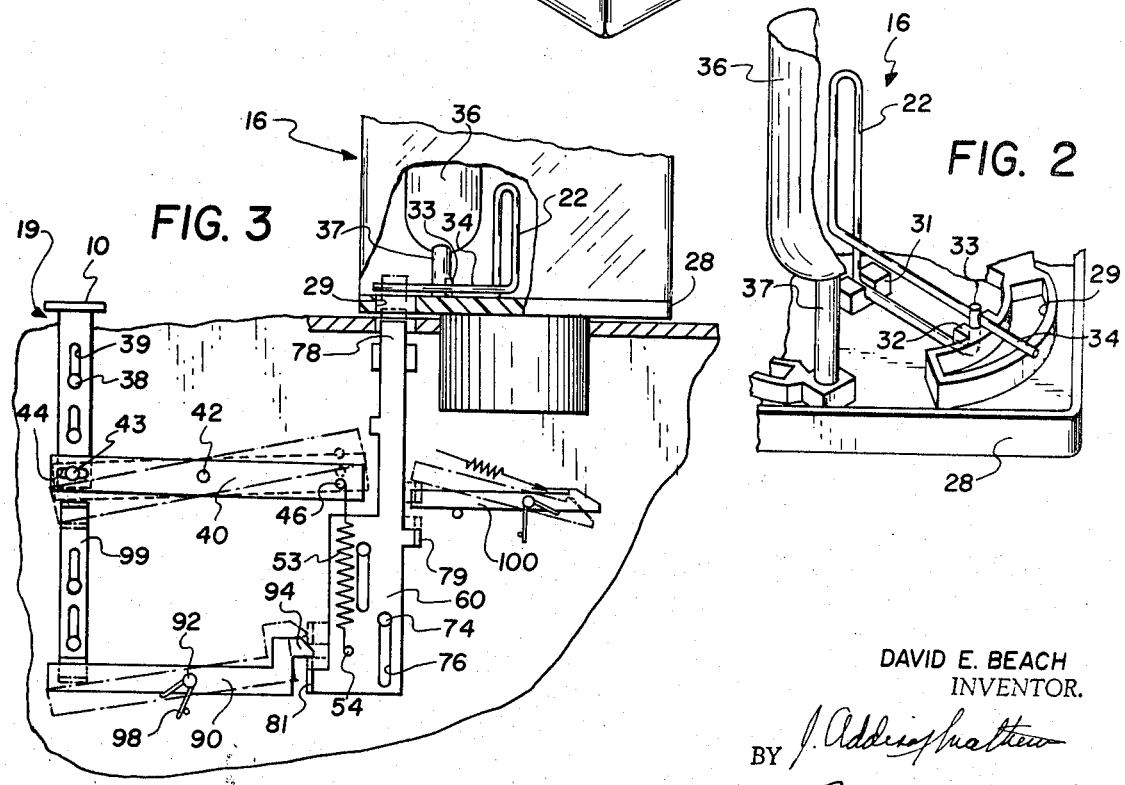
FIG. 2
FIG. 3
DAVID E. BEACH
INVENTOR.
BY J. Addis Matthew
Robert W Hampton
ATTORNEYS Patented Aug. 29, 1972

DAVID E. BEACH
INVENTOR.

BY *Addison Matthews*
*Robert W Hampton*

ATTORNEYS

3,687,033

MECHANISM FOR OPERATING A CAMERA SHUTTER AND A MECHANICALLY OPERABLE FLASH DEVICE IN SYNCHRONISM

CROSS-REFERENCES TO RELATED APPLICATIONS

Reference is made to the following commonly assigned, copending U.S. Pat. applications: Ser. No. 766,751, entitled PERCUSSION-IGNITABLE FLASH UNIT HAVING CONTACT-ACTUATABLE, PRE-ENERGIZED STRIKERS AND PHOTOGRAPHIC APPARATUS USING SUCH UNITS, filed on Oct. 11, 1968, in the names of J.V.Poweska et al; Ser. No. 850,007, entitled FLASHLAMP SENSING AND PERCUSSIVE FIRING MECHANISM FOR PHOTOGRAPHIC APPARATUS, filed on Aug. 14, 1969, in the name of W.T.Hochreiter; Ser. No. 838,408, entitled METHOD AND APPARATUS FOR FIRING PERCUSSIVELY IGNITABLE PHOTOFLASH LAMPS, filed on July 2, 1969, in the names of O.H.Biggs et al; and Ser. No. 655,468, entitled PHOTOGRAPHIC APPARATUS, filed on July 24, 1967, in the name of D.N.Brooks.

BACKGROUND OF THE INVENTION

1. Field of the Invention

The present invention relates generally to photographic apparatus and in particular to mechanisms for synchronizing the operation of photographic shutter mechanisms and flash devices.

2. Description of the Prior Art

In order to overcome various well-known problems with electrical flashlamps, mechanically fireable lamps recently have been developed that are actuated by a percussive impact. At least in the preferred form, such lamps have been incorporated into flash devices including a pre-energized striker that is releasable to percussively impact and fire the lamp. Such mechanically operable flash devices are desirable for photographic use because of the highly reliable actuating systems that can be designed to release the striker and fire the lamp without any risk of poor electrical contacts or weak electrical energy sources. A flash device of the mechanically operable type is described, for example, in commonly assigned copending U.S. Pat. application Ser. No. 766,751, filed on Oct. 11, 1968, in the names of J.V.Poweska et al.

A problem basic to any photographic apparatus intended for use with a flash device is synchronizing flash ignition with the shutter operation. Normally, synchronization is accomplished by either of two methods. In one, a high speed member is first energized in response to film winding, for example, and then is released to effect the operation of both shutter and flash device. Such a mechanism is disclosed in Brooks U.S. Pat. application Ser. No. 655,468. In the other method, the body release itself is used as a synchronizing member, as disclosed in Biggs U.S. Pat. application Ser. No. 838,408.

In the first method of synchronizing, the energy to drive the synchronizing member is stored preliminary to camera operation, and linkages or other means must be used to transmit energy introduced during some preparatory camera function. Often energy take off is accomplished from the film-advance mechanism, and the linkage necessary to transmit the energy by such means provides increased opportunity for reliability problems. The increased complexity also results in increased manufacturing costs. The second method of synchronizing is even more objectionable because it is dependent on the character of the operating stroke of the camera user in depressing the body release or operating member.

Thus, it would be desirable to have a mechanism utilizing a synchronizing member which derives all of its required energy through its actuating linkage with the body release member, yet is not dependent on the character of operation of the release member.

SUMMARY OF THE INVENTION

Accordingly, an object of the present invention is to provide a mechanism to effect synchronized operation of the flash device and the shutter means of a photographic apparatus which mechanism is reliable and simple of construction.

Another object of the invention is to provide such an improved mechanism which derives its energy for synchronization from the camera body release or other actuating member during the actual picture-taking operation as opposed to a pre-energized mechanism requiring additional linkages to transmit energy during some preliminary operation such as film winding.

Another object of the invention is to provide such an improved mechanism wherein the synchronizing member directly actuates the flash device.

BRIEF DESCRIPTION OF THE DRAWINGS

FIG. 1 is a perspective view of a photographic apparatus of a type wherein the invention might be used. A multilamp flash device is shown mounted for operation.

FIG. 2 is a cut-away perspective view showing a preenergized striker used in one type of mechanically operable flash device.

FIG. 3 is a front elevational view showing the operating mechanism for the shutter and flash device according to one embodiment of the present invention.

DESCRIPTION OF THE PREFERRED EMBODIMENT

Figure 4:
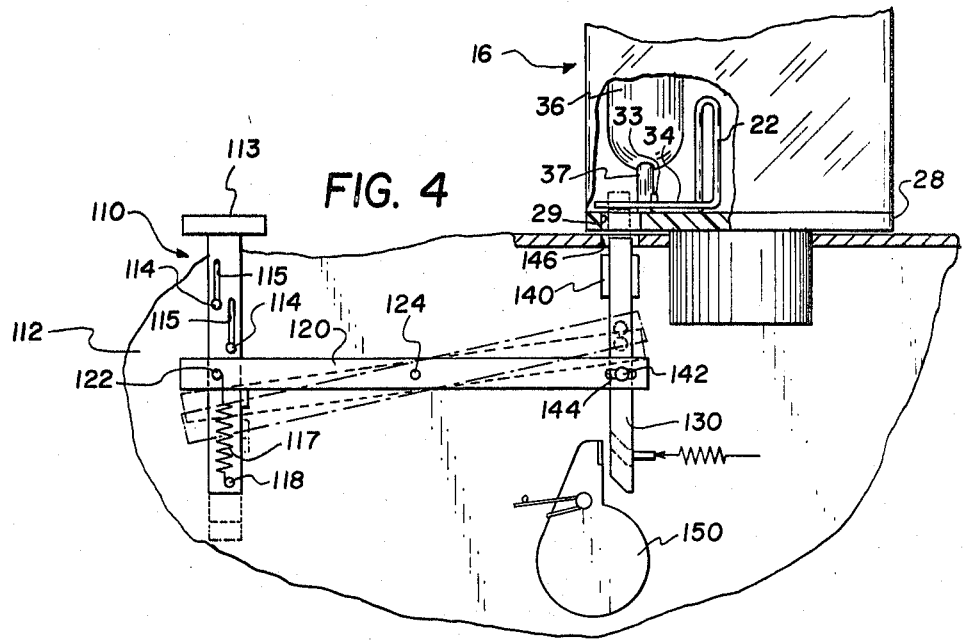
FIG. 4 is a front elevational view showing the operating mechanism for the shutter and flash device according to another embodiment of the present invention.

A camera suitable for incorporation of the mechanism of the invention is shown in FIG. 1. The camera body 12 houses a viewfinder 14, an objective 18, and a body release or camera operating member 19. The body release 19 is positioned for convenient actuation by a camera operator and has a pressure surface 10 conveniently located for the application of actuating force by the operator. A flash device 16 is shown mounted on the camera body 12.

The flash device comprises a base 28 having an access opening 29 therein to permit passage of an actuating member therethrough. Mounted on base 28 are retaining elements 31 and 32 (FIG. 2) which retain an arm of striker spring 22. The lower arm of spring 22 retained by elements 31 and 32 has an upturned end 33 as shown which engages and lodges the percussion leg 34 of striker spring 22 in a pre-energized position. The percussively ignitable flashlamp 36 includes a percussion tube 37 and the flashlamp is held in position on the base such that the tube will be rapidly engaged or impacted by the striker spring upon release thereof by a camera or other mechanism as illustrated.

The elements are shown in full lines in their positions prior to operation. Broken lines are used to indicate the position of the elements at mid-operation. Body release 19 is slidably mounted on camera body 12 by means of pins 38 fixed on camera body 12 which pins extend into elongated slots 39 respectively on body release 19. Link member 40 is pivotally mounted within camera body 12 on fixed pivot 42. A pin 43 on body release 19 is engaged in an elongated slot 44 on one end of link member 40. A pin 46 on the opposite end of link 42 is secured to the upper end of resilient member or spring 53. The lower end of the spring is connected to a pin 54 mounted on a synchronizing member 60. Synchronizing member 60 is slidably mounted inside the camera body 12 by means of pins 74 mounted in camera body 12 which extend into elongated slots 76 respectively in synchronizing member 60. Synchronizing member 60 comprises, a flash actuating finger 78, a shutter triggering finger 79 and a latching finger 81. A latching member 90 is pivotally mounted within camera body 12 to rock about pivot pin 92. Latch spring 98 biases the latch member 90 to a latching position. When the latch member 90 is in the latch position a latch stop 94 engages latching finger 81 of the synchronizing member 60.

Slidably mounted within the camera body is a latch release member 99. The upper end of member 99 engages the lower end of body release 19 and the lower end of member 99 engages the end portion of latch member 90.

The operation of the embodiment in FIG. 3 is as follows: The operator depresses body release member 19 by applying a downward force at surface 10. The downward motion of body release member 19 causes link member 40 to rock in a counterclockwise direction about its pin 42. Pin 46 of link member 40 moves in a predominantly upward direction carrying with it the upper end of spring 53. Synchronizing member 60 moves upwardly until the latching finger 79 engages the latch stop 94 of latch member 90. In this position the flash actuating finger 78 at the upper end of synchronizing member 60 extends through the access opening 29 in the base 28 of the flashcube and into engagement with or spaced adjacent to the percussion leg or striker 34. Continued depression of the body release member 19 extends spring 53 to store energy therein and pivots latch member 90. The latch member 90 is constructed so that it releases synchronizing member 60 when sufficient energy is stored by spring 53 to actuate the flash and effect operation of the shutter. When latch member 90 releases the synchronizing member 60, the synchronizing member moves upwardly under the urging of spring 53 so that the percussion leg or striker 34 of the striker spring 22 is moved upwardly over stop 33 and is released for striking engagement with percussion tube 24. This motion is synchronized with the movement of shutter trigger finger 79 into engagement with shutter opening means 100 to release the shutter.

In FIG. 4 there is shown another embodiment of the present invention. The elements are shown in full lines in their position prior to operation. Broken lines indicate the element positions in operation. Body release member 110 is slidably mounted on camera body 112 and is positioned to have surface 113 conveniently accessible to the operator. Projections 114 fixed within camera body 112 are engaged within elongated slots 115 respectively of body release member 110 and serve to guide its motion. The lower end of spring 117 is connected to retainer or projection 118 on body release member 110. A link member 120 is pivotally mounted within the camera body on pivot point 124. The upper end of spring 117 is connected to retainer or projection 122 on link member 120. Synchronizing member 130 is slidably mounted within the camera body and is guided by projections 140 fixedly mounted within the camera body. Projection 142 on synchronizing member 130 moves within an elongated slot 144 in link member 120. The camera body 112 has an opening 146 in alignment with the opening in the base of the flash device and the percussion leg or striker of the flash device is positioned to permit synchronizing member 130 to thrust there against when moving upwardly in an operative stroke. Pre-energized shutter driver 150 abutts the lower end of synchronizing member 130 prior to operation.

Intended operation of the FIG. 4 embodiment is as follows. The operator depresses body release 110 by applying a downward force at surface 113. The motion of body release 110 is transmitted to link member 120 by spring 117 which urges link member 120 to rock in a counterclockwise direction. The rocking of link member 120 urges synchronizing member 130 upwardly until it engages the percussive leg of the striker spring in the flash device where the synchronizing member 130 is restrained. Link member 120 is no longer free to rock and further depression of body release member 110 results in tensioning of spring 117 and increased force applied to the percussive leg of the striker spring with the flash device.

When the force reaches a sufficient level the stored energy of spring 117 is transmitted by link member 120 to synchronizing member 130 and percussion leg is dislodged or released to strike and actuate the flash device. Upon sufficient movement of synchronizing member 130 pre-energized shutter 150 is freed to function for the exposure of film receivable in the camera casing.

Figure 5:
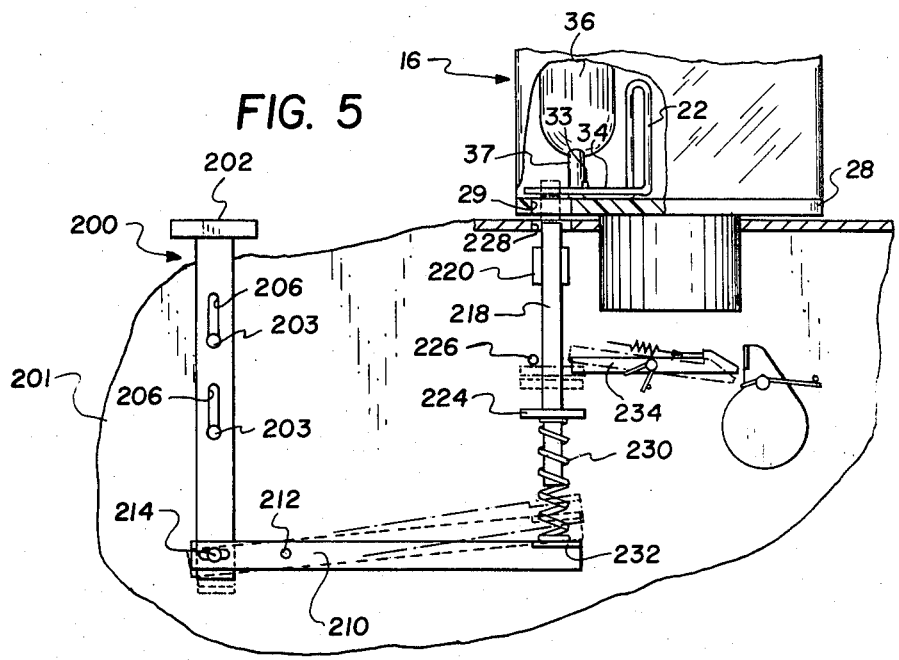
FIG. 5 is a front elevational view showing the operating mechanism for the shutter and flash device according to yet a third embodiment of the present invention.

In FIG. 5 there is shown another embodiment of the present invention. The elements are shown in full lines in their positions prior to operation. Broken lines are used to indicate the positions during operation. Body release 200 is slidably mounted on camera body 201 and is positioned to have a contact surface 202 conveniently accessible to the operator. Projections 203 fixed within camera body 201 are engaged within elongated slots 206 on body release 200 to guide the motion of the body release. Link member 210 is pivotally mounted within camera body 201 by fixed pivot 212. A pin 214 on body release 200 is engaged in an elongated slot on one end of link member 210.

Synchronizing member 218 is slidably mounted within the camera and is guided by projections 220 fixedly mounted within the camera body. A collar 224 is secured to synchronizing member 218 at a point approximately half the distance between the center of and bottom of synchronizing member 218. Coil spring 230 is interposed between spring support surface 232 of link member 210 and collar 224 and is positioned to enclose the lower end of synchronizing member 218.

A stop pin 226 is fixed to the camera body 201 and engages collar 224 terminating the upward operative movement of synchronizing member 218. The camera body 201 has an opening 228 in alignment with the opening in the base of the flash device permitting the synchronizing member 218 to engage the percussion leg or striker of the device.

Intended operation of the FIG. 5 embodiment is as follows. The operator depresses body release 200 by applying a downward force at surface 202. The downward movement of body release 200 causes connected link member 210 to rock about its pivot point in a counterclockwise direction resulting in an essentially upward movement of spring support surface 232. Spring 230 being compressed between spring support surface 232 and collar 224 urges synchronizing member 218 upwardly into restraining engagement with the percussion leg of the flash device. Further depression of body release 200 results in energy storage in spring 230. When the stored energy reaches sufficient level the percussion leg of the flash device is released to actuate the flash device. Stored energy from spring 230 is transferred to synchronizing member 218 propelling it upwardly causing synchronized actuation of shutter operating means 234.

The invention has been described in detail with particular reference to a preferred embodiment thereof, but it will be understood that variations and modifications can be effected within the spirit and scope of the invention.

We claim:

1. In photographic apparatus for use with photoflash units of the type having at least one flash lamp fireable by striking and at least one striking mechanism including a pre-energized striking element releasable to effect such striking, said apparatus including:
   means for receiving a flash unit of the type described;
   means for releasing the striking element of a striking mechanism of a received unit, said releasing means being movable from a first position to a second position to contact the striking mechanism and from said second position to a third position to release the striking element; and
   a shutter;
the improvement comprising:
   means for actuating said shutter in response to movement of said releasing means from said second position to said third position; and
   means for applying a gradually increasing force to said releasing means urging said releasing means from said first position toward said third position to first move said releasing means into nonreleasing contact with said striking mechanism and then gradually increase the force on said striking mechanism until said striking element is released.

2. In photographic apparatus for use with photoflash units of the type having at least one flash lamp fireable by striking and at least one striking mechanism including a pre-energized striking element releasable to effect such striking, said apparatus including:
   means for receiving a flash unit of the type described;
   a shutter driver movable from a first position to a second position for actuating a shutter;
   means for urging said shutter driver from said first position toward said second position; and
   an actuating member movable from a first position to a second position to contact a striking mechanism of a received flash lamp unit and from said second position to a third position to release the striking element of the striking mechanism;
the improvement comprising:
   latch means coupled to said actuating member for movement therewith for holding said shutter driver in its first position during movement of said actuating member from its first to its second position and for releasing said shutter driver in response to movement of said actuating member from its second to its third position; and
   means for applying a gradually increasing force to said actuating member urging it from its first toward its third position to first move it into nonreleasing contact with said striking mechanism and them, as said force is increased, apply a releasing force to said striking mechanism to release said striking element and said shutter driver in timed relation.

3. In photographic apparatus for use with photoflash units of the type having at least one flash lamp fireable by striking and at least one striking mechanism including a pre-energized striking element releasable to effect such striking, said apparatus including:
   means for receiving a flash unit of the type described;
   means for releasing the striking element of a striking mechanism of a received unit, said releasing means being movable from a first position to a second position to contact the striking mechanism and from said second position to a third position to release the striking element;
   a shutter; and
   a body release movable from a first position to a second position;
the improvement comprising:
   means for actuating said shutter in direct response to movement of said releasing means from its second position to its third position; and
   means for moving said releasing means from its first position to its third position to release the striking element, said moving means including resilient coupling means between said body release and said releasing means gradually energizeable by movement of said body release from its first position to its second position, for urging said releasing means first into nonreleasing engagement with the striking mechanism and then for gradually increasing the force of said releasing means on said striking mechanism until said striking element is released and said releasing means moves to its third position.

4. In photographic apparatus for use with photoflash units of the type having at least one flash lamp fireable by striking and at least one striking mechanism including a pre-energized striking element releasable to effect such striking, said apparatus including:
  means for receiving a flash unit of the type described;
  means for releasing the striking element of a striking mechanism of a received unit, said releasing means being movable from a first position to a second position to contact the striking mechanism and from said second position to a third position to release the striking element; and
  means for moving said releasing means from its first position to its third position to release the striking element;
the improvement comprising:
  means for actuating said shutter in direct response to movement of said releasing means from said second position to said third position.

5. The improvement according to claim 4, wherein said apparatus includes:
  a shutter actuating member movable from a first position to a second position to actuate said shutter;
  means for releasably holding said shutter actuating member in its first position;
  means for urging said shutter actuating member from its first position toward its second position; and
  means coupled to said means for releasing the striking element for releasing said shutter actuating member during movement of said means for releasing the striking element from its second position to its third position.

6. In photographic apparatus for use with photoflash units of the type having at least one flash lamp fireable by striking and at least one striking mechanism including a pre-energized striking element releasable to effect such striking, said apparatus including:
  means for receiving a flash unit of the type described;
  a shutter;
  a shutter driver holdable in an energized first position and releasable for movement to a second position for actuating said shutter;
  an actuating member movable from a first position to a second position to contact a striking mechanism of a received flash unit and from said second position to a third position to release the striking element associated with the striking mechanism;
the improvement wherein:
  said actuating element includes a latch movable therewith for releasably holding said shutter driver in its energized first position during movement of said actuating element from its first position to its second position and for releasing said shutter driver during movement of said actuating element from its second to its third position.

7. The improvement according to claim 6, wherein said latch is integral with said actuating element.

8. In photographic apparatus for use with photoflash units of the type having at least one flash lamp fireable by striking, and at least one striking mechanism, including a pre-energized striking element releasable to effect such striking, said apparatus including:
  means for receiving a flash unit of the type described;
  a shutter;
  a shutter driver holdable in an energized first position and releasable for movement to a second position for actuating said shutter;
  a releasable latch for holding said shutter driver in said energized first position; and
  an actuating member movable from a first position to a second position to contact a striking mechanism of a received flash unit and from said second position to a third position to release the striking element associated with the striking mechanism;
the improvement comprising:
  means coupled to said actuating element for movement therewith for releasing said latch during movement of said actuating member from its second position to its third position.

9. The improvement according to claim 8 wherein said latch releasing means is integral with said actuating member.

10. In photographic apparatus for use with photoflash units of the type having at least one flash lamp fireable by striking, and at least one striking mechanism including a pre-energized striking element releasable to effect such striking, said apparatus including:
  means for receiving a flash unit of the type described;
  a shutter;
  a shutter driver holdable in an energized first position and releasable for movement to a second position for actuating said shutter;
  a releasable latch for holding said shutter driver in said energized first position;
  an actuating member movable from a first position to a second position to contact a striking mechanism of a received flash unit and from said second position to a third position to release the striking element associated with the striking mechanism;
the improvement comprising:
  means coupled to said actuating element for movement therewith for releasing said latch during movement of said actuating member for its second position to its third position; and
  means for applying a gradually increasing force to said actuating member urging said member from said first position toward said third position to first move said actuating member into nonreleasing force applying contact with the striking mechanism and to then gradually increase the force on the striking mechanism until the striking element is released and said actuating member is moved to its third position thereby releasing said latch in timed relation with releasing the striking element.

11. For use with photoflash units of the type having at least one flashlamp fireable by striking and at least one pre-energized striker lodged in an energized position from which it is disoldgeable to effect such striking, photographic apparatus comprising:
  a shutter;
  means for receiving a flash unit of the type described;
  a synchronizing member movable from a first position to a second position into nonreleasing contact with a pre-energized striker of a received unit and from said second position to a third position beyond said second position in the absence of a striker in its pre-energized position;
  means for applying synchronizing force to said synchronizing member sufficient to urge said synchronizing member toward its third position in the absence of a striker in its pre-energized position but insufficient to dislodge a striker from its pre-energized position;

means for dislodging said striker from its pre-energized position to permit said synchronizing member to move to its third position at least partially under the urging of said synchronizing force; and means coupled to said synchronizing member for actuating said shutter in response to movement of said synchronizing member to its third position.

12. For use with photoflash units of the type having at least one flashlamp fireable by striking and at least one pre-energized striker for each such lamp releasably held in a pre-energized position from which said striker is releasable to effect such striking, photographic apparatus comprising:

a shutter;

means for receiving a flash unit of the type described;

a synchronizing member positionable in contact with a pre-energized striker of a received unit;

means for applying a force to said synchronizing member urging it to move through an operative path, such movement being restrainable by a contacted pre-energized striker;

means for releasing a contacted striker to permit movement of said synchronizing member through said operative path, and means coupled to said synchronizing member for actuating said shutter in response to movement of said synchronizing member through its operative path.

13. For use with photoflash units of the type having at least one flashlamp fireable by striking and at least one pre-energized striker for each such lamp releasably held in a pre-energized position from which such striker is releasable to effect such striking, photographic apparatus comprising:

shutter;

means for receiving a flash unit of the type described;

a synchronizing member positionable in contact with a pre-energized striker of a received unit;

resilient means for applying a force to said synchronizing member urging it to move through an operative path such movement being restrainable by a contacted pre-energized striker;

means for releasing a contacted striker to permit movement of said synchronizing member through said operative path under the urging of said force applying means; and means coupled to said synchronizing member for actuating said shutter in response to movement of said synchronizing member through its operative path under the urging of said force applying means.

* * * * *